(12) United States Patent
Johnson et al.

(10) Patent No.: US 12,559,036 B2
(45) Date of Patent: Feb. 24, 2026

(54) FLEXIBLE STEP JOINT

(71) Applicant: Magna Exteriors Inc., Concord (CA)

(72) Inventors: Jeffrey R. Johnson, White Lake, MI (US); Jeffry J. Zielinski, Metamora, MI (US)

(73) Assignee: Magna Exteriors Inc., Aurora (CA)

( * ) Notice: Subject to any disclaimer, the term of this patent is extended or adjusted under 35 U.S.C. 154(b) by 601 days.

(21) Appl. No.: 17/703,510

(22) Filed: Mar. 24, 2022

(65) Prior Publication Data

US 2022/0306004 A1 Sep. 29, 2022

Related U.S. Application Data

(60) Provisional application No. 63/165,473, filed on Mar. 24, 2021.

(51) Int. Cl.
B60R 3/02 (2006.01)
B60R 3/00 (2006.01)

(52) U.S. Cl.
CPC ............... B60R 3/02 (2013.01); B60R 3/002 (2013.01)

(58) Field of Classification Search
CPC .. B60R 3/02; B60R 3/002; B60R 3/00; B60R 3/007
See application file for complete search history.

(56) References Cited

U.S. PATENT DOCUMENTS

| | | | | |
|---|---|---|---|---|
| 672,289 | A * | 4/1901 | Sanders | B60R 3/02 182/89 |
| 3,329,443 | A * | 7/1967 | Lowder | B60R 3/02 280/166 |
| 3,771,815 | A * | 11/1973 | Bridges | B60R 3/02 280/166 |
| 3,833,240 | A * | 9/1974 | Weiler | B60R 3/02 280/166 |
| 4,078,831 | A * | 3/1978 | Korhonen | B60R 3/02 280/770 |
| 5,280,934 | A * | 1/1994 | Monte | B60R 3/02 182/127 |
| 5,498,012 | A * | 3/1996 | McDaniel | B60R 3/02 182/89 |
| 5,758,891 | A * | 6/1998 | Fox, Jr. | B60R 3/00 293/118 |
| 5,897,125 | A * | 4/1999 | Bundy | B60R 3/02 280/169 |
| 6,168,176 | B1 * | 1/2001 | Mueller | B60R 3/02 182/95 |
| 6,357,773 | B1 * | 3/2002 | Griebel | E02F 9/0833 280/166 |
| 6,435,534 | B1 * | 8/2002 | Stone | B60R 3/02 182/127 |
| 6,471,002 | B1 * | 10/2002 | Weinerman | B60R 3/02 280/166 |

(Continued)

*Primary Examiner* — James M Dolak

(57) ABSTRACT

A mounting system for a step of a vehicle. A step portion having a connecting flange. A load bearing adapter connected to the connecting flange via a lost motion connecting assembly for allowing substantially rigid connection when the step portion has a normal stepping load and allows tilting of the step when an obstacle is encountered which provides a load on the step in an upward direction. Wherein an upward force on the step portion allows upward movement of the step and returning it to the step position.

12 Claims, 5 Drawing Sheets

(56)       References Cited

U.S. PATENT DOCUMENTS

| | | | | |
|---|---|---|---|---|
| 6,533,303 | B1 * | 3/2003 | Watson | B60R 3/02 |
| | | | | 280/166 |
| 7,413,205 | B2 * | 8/2008 | Watson | B60R 3/02 |
| | | | | 280/166 |
| 8,056,913 | B2 * | 11/2011 | Kuntze | B60R 3/002 |
| | | | | 280/166 |
| 8,177,247 | B1 * | 5/2012 | Carr | B60R 3/02 |
| | | | | 280/166 |
| 8,342,550 | B2 * | 1/2013 | Stickles | B60R 3/00 |
| | | | | 280/166 |
| 9,272,667 | B2 * | 3/2016 | Smith | B60R 3/02 |
| 9,481,308 | B2 * | 11/2016 | Dringenberg | B60R 3/02 |
| 9,676,367 | B2 * | 6/2017 | Barron | B60R 19/54 |
| 9,744,908 | B1 * | 8/2017 | Hodges | B60R 3/002 |
| 9,764,691 | B2 * | 9/2017 | Stickles | B60R 3/02 |
| 10,604,077 | B2 * | 3/2020 | Stanesic | H04N 19/91 |
| 12,151,650 | B2 * | 11/2024 | Migdal | B60R 3/02 |
| 12,202,438 | B2 * | 1/2025 | Smith | B60R 3/02 |
| 12,330,571 | B2 * | 6/2025 | Salter | B60R 3/002 |
| 12,370,952 | B2 * | 7/2025 | Watson | B60R 3/002 |
| 2003/0094781 | A1 * | 5/2003 | Jaramillo | B60R 3/02 |
| | | | | 280/166 |
| 2004/0207224 | A1 * | 10/2004 | Miller | B60R 3/02 |
| | | | | 296/57.1 |
| 2020/0181963 | A1 * | 6/2020 | Digel | E05D 3/145 |

* cited by examiner

FLEXIBLE STEP JOINT

CROSS-REFERENCE TO RELATED APPLICATIONS

This application is a non-provisional patent application and claims benefit of U.S. Provisional Patent Application No. 63/165,473, filed Mar. 24, 2021. The disclosure of the above application is incorporated herein by reference.

FIELD OF THE INVENTION

The present invention relates to a flexible step joint for mounting of a side step or running board step to vehicle.

BACKGROUND OF THE INVENTION

Side steps, running boards and automatic running boards are used with higher vehicles such as Jeeps, pickup trucks and utility vehicles. Because the trucks extend down to allow users to more easily enter a higher height vehicle the steps may be subject to interference with ground obstacles such as a curb or the like. This problem is particularly an issue with off road vehicles where rocks, stumps, banks of ditches and other obstacles can find interference with the lower mounted or extending step or running board of a vehicle. If this situation presents itself the running board also becomes a rail like protector for the sides of the vehicle. Since the loads of such impacts are variable an encounter with a rock or the like could break mounts to the vehicle. This is particularly problematic when the step is an automated running board arrangement which includes motors four bar links and other expensive hardware.

Rock sliding and upward loading present a concern with that load being transferred to the links of a step mount for a vehicle. To take the load off of the links, the plan with the Gen 2 style rock slider is for the step to mate off to the frame, and transfer the load through the frame, and not the links. Tolerance of the linkages and the step make designing a touch or very close condition between the step and frame very difficult. This concept allows for the step to flex up, to contact the frame, without putting all of the loading on the linkages, while still maintaining rigidity for stepping loads in the down direction. This joint can be used on any running board application (Static, Gen 2, Gen V, etc.) where upward loading is expected, and can be distributed through a flexible joint to more structural components of the component/vehicle.

SUMMARY OF THE INVENTION

In its broadest aspects the present invention a mounting system for a step of a vehicle provided. The mounting system includes a step portion having a connecting flange. A load bearing adapter is connected to the connecting flange via a lost motion connecting assembly for allowing substantially rigid connection when the step portion has a normal stepping load and allows tilting of the step when an obstacle is encountered which provides a load on the step in an upward direction. Wherein an upward force on the step portion allows upward movement of the step and returning it to the step position.

The present invention provides a mounting system for a step of a vehicle. A step portion having two connecting flanges substantially along the same vertical plane is provided. The system includes a load bearing adapter for mounting the step including a first vertical leg, a second vertical leg and a horizontally extending intermediate leg connecting the first vertical leg and second vertical leg. Each of the first vertical leg and second vertical legs have an outboard and an inboard side in relationship to a final attachment to a vehicle. A first flange of the connecting flanges is positioned next to the inboard surface of a first vertical leg and a second flange of said two connecting flanges is positioned next to said outboard surface of said second vertical leg. A first fastener assembly is provided for moveably fastening said first flange to said inboard flange of said first vertical flange said fastener including a biasing spring for providing biasing toward the outside and providing lost motion (shown at 11) to the inside. A second fastener assembly for moveably fastening said second flange to said outboard flange with a biasing spring interposed between a fastener head and the inboard side of the second vertical leg. An upward force on the step portion for instance in an encounter with a rock or other obstacle allows upward movement of the step and returning it to the step position thereby protecting mounting hardware or linkages mounted to the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 4:
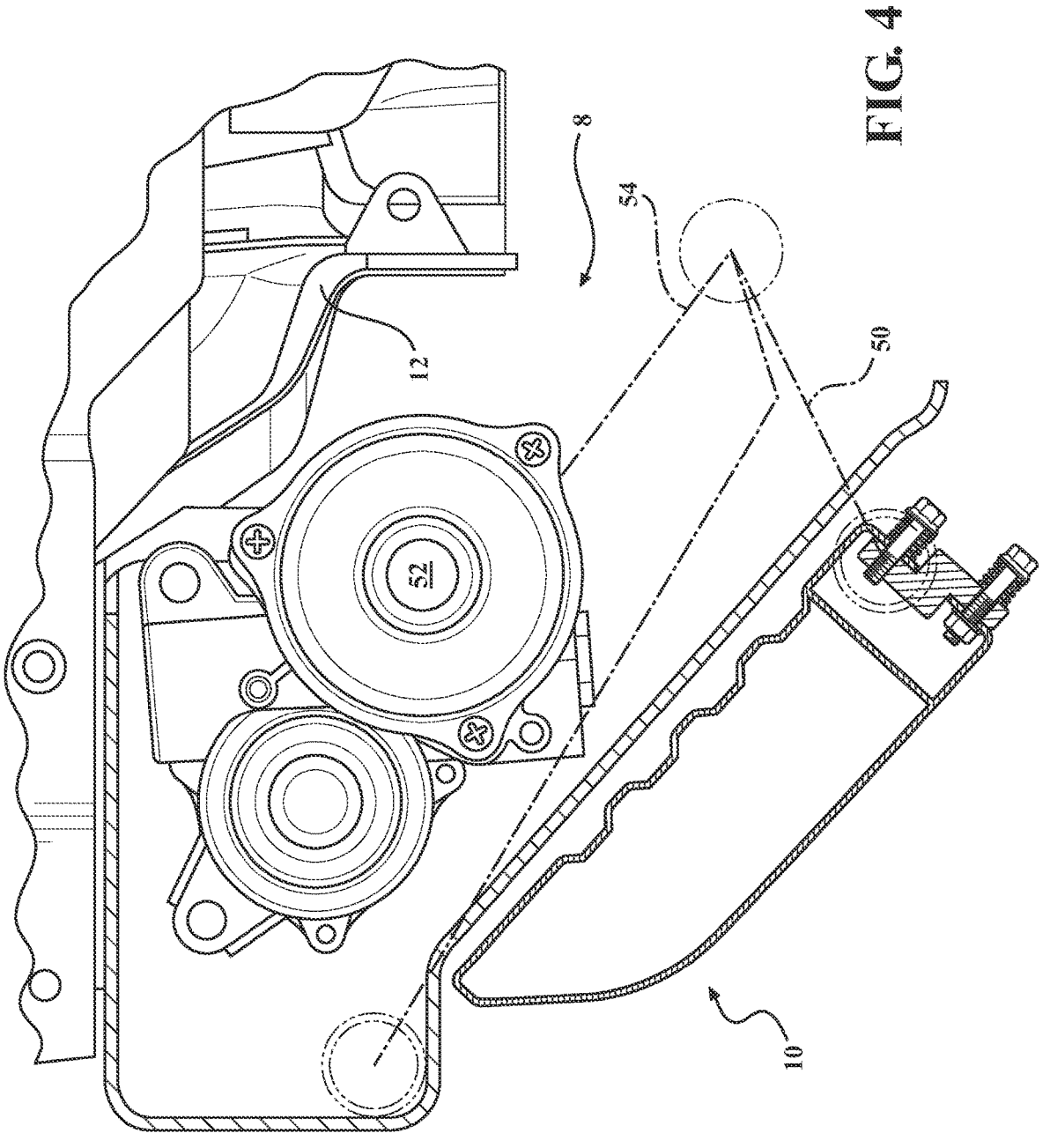
FIG. 4 is an example of an automated running board in which the step mounting assembly would be useful.
Figure 5:
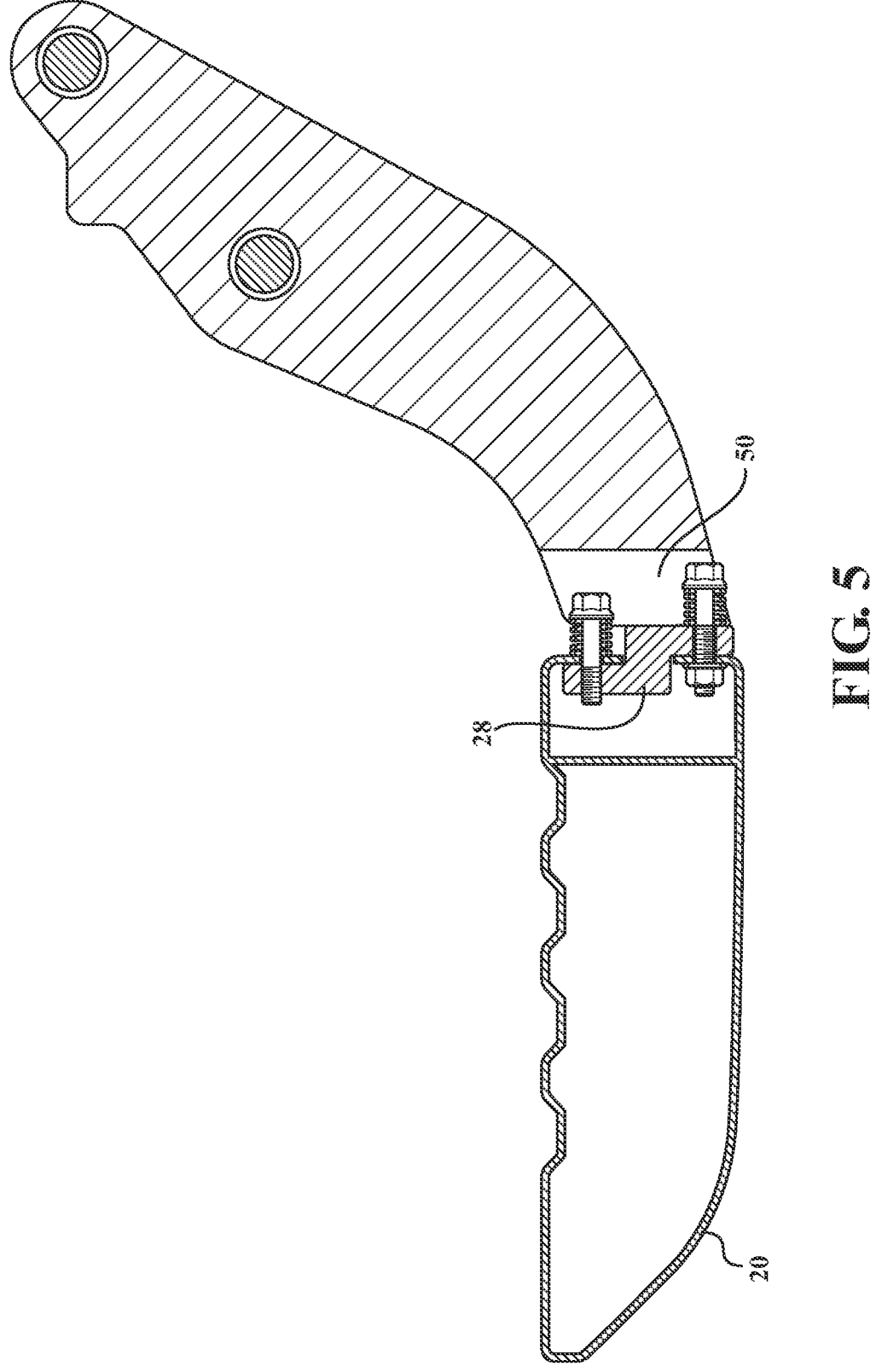
FIG. 5 is a side view of attachment to a lower mount of a four bar linkage.

In accordance with the present invention there is provided a step mounting system generally shown at 10 for a step of a vehicle 12. The step assembly 10 can be a powered automatic running board, a fixed step or a mechanical step for an SUV, pickup truck, utility van or vehicle or any other vehicle wherein it is desirable to have a step assist into a vehicle. As shown in FIG. 4 and FIG. 5 in one embodiment the step is connected to a four bar automatic running board system 8 as are known in the art and schematically shown in FIG. 4.

Figure 1:
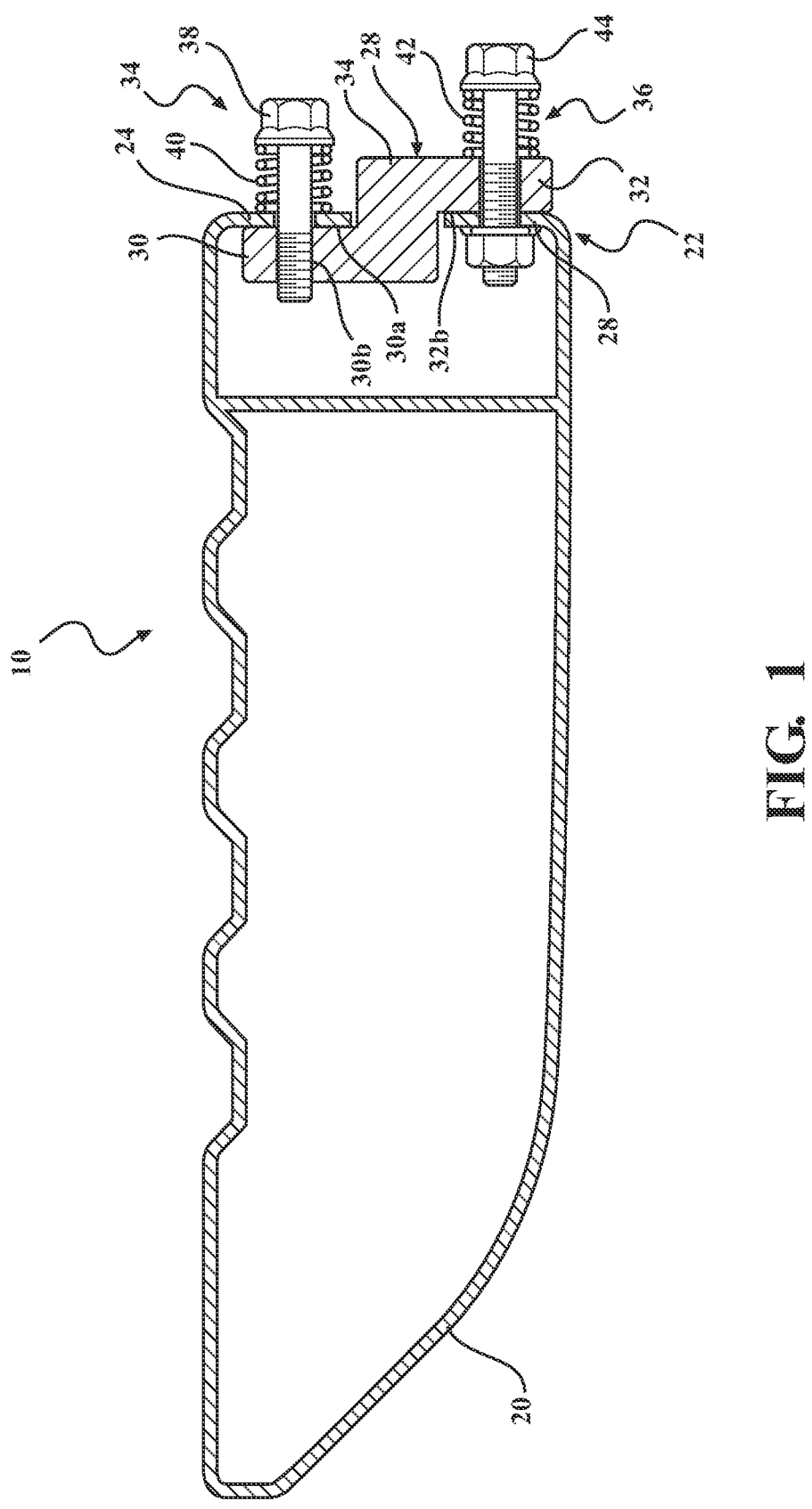
FIG. 1 is a sectional view of the step mounting assembly of the present invention.
Figures 2A, 2B:
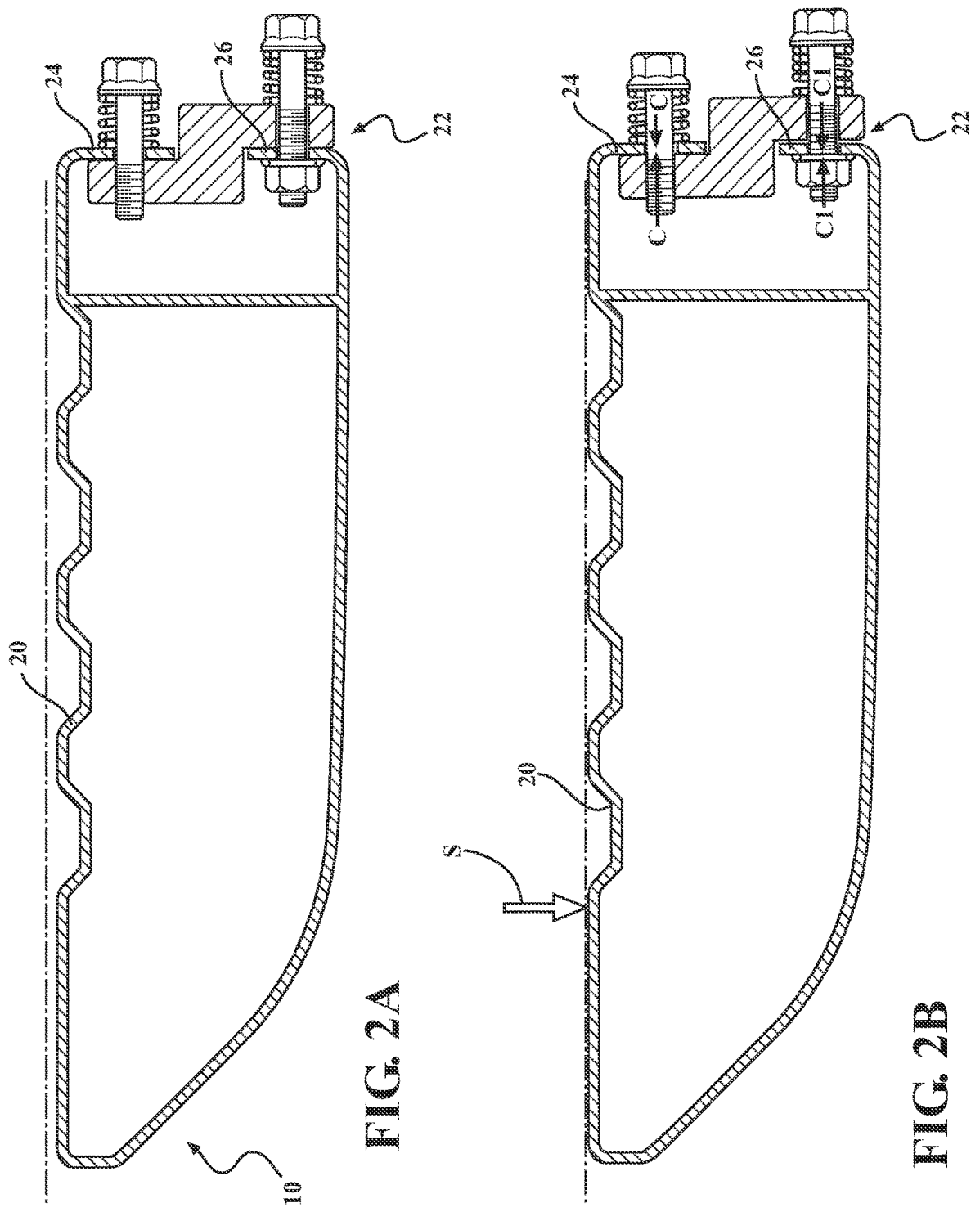
FIG. 2A is a sectional view showing the operation of the compressive loads of the step mounting assembly of the present invention.
FIG. 2B is a sectional view showing the operation of the compressive loads of the step mounting assembly of the present invention.

Referring now to the FIGS. 1 through 2B there is provided a step portion 20 having two connecting flanges generally indicated at 22. The connecting flanges include an upper flange 24 which extends downwardly and a lower flange 26 which extends upwardly. The upper flange 24 and lower flange 26 are configured such that they are aligned substantially along the same vertical plane. In a preferred embodiment the step portion 20 is an extruded aluminum or roll formed steel which provides a 'C' shaped channel, and the flanges are integrally formed to provide an elongated rigid section for supporting a vehicle driver or passenger.

The step assembly 10 includes a load bearing adapter 28 including a first vertical leg 30, a second vertical leg 32 and a horizontally extending intermediate leg 34 connecting the first vertical leg 30 and second vertical leg 32. Each of the first vertical leg 30 and second vertical leg 32. The first vertical leg 30 has an inboard surface 30a closest to the vehicle and an outboard surface 30b. Likewise, the second vertical leg 32 has an outboard 32b and an inboard 32a side in relationship to a final attachment to a vehicle. The first flange 24 of said connecting flanges 22 is positioned next to the inboard surface 30a of the first vertical leg 30. The second flange 26 of the two connecting flanges 22 is positioned next to said outboard surface 32b of the second vertical leg 32.

As shown in FIG. 5 the load bearing adapter is attached to the lower mount 50 of an automated running board linkage 8. As is known in the art the motor unit 52 of an automated running board powers the four bar linkage 54 to extend the step from a stowed to a deployed position. The step is usable for allowing a passenger to step on it to assist in entering or exiting the vehicle.

A first fastener assembly 34 is provided for moveably fastening the first flange 24 to said inboard side 30a of said first vertical leg 30. The fastener assembly 34 includes a fastener 38 including a biasing spring 40 for providing biasing toward the outside and providing lost motion to the inside.

A second fastener assembly 36 is provided for moveably fastening the second flange 26 to said outboard surface 32b with a biasing spring 42 interposed between a fastener head 44 and the inboard side 32a of the second vertical leg 32. A weld nut 46 is provided on the outboard side of flange 26 to provide a threaded connection for the fastener 44.

Figures 3A, 3B:
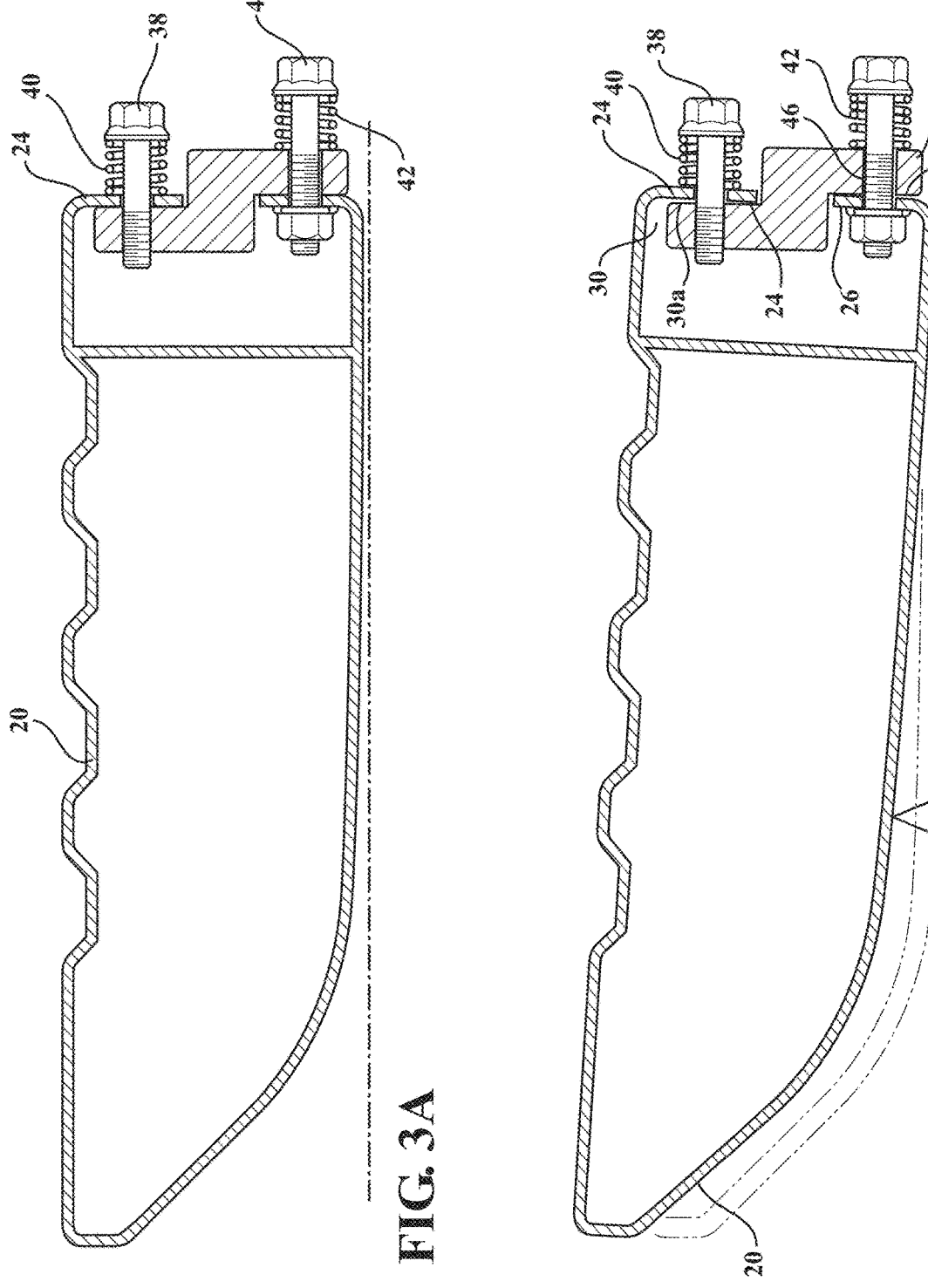
FIG. 3A is a sectional view showing the operation of the step mounting assembly of the present invention.
FIG. 3B is a sectional view showing the operation of the compressive loads of the step mounting assembly of the present invention.

Referring now to FIG. 3 when an upward force on the step portion is encountered such as in a rockslide encounter the attachment system allows upward movement of the step and returning it to the step position. As shown in FIGS. 3A and 3B the fastener 38 is threaded into the first vertical leg and lost motion is allowed for compressing of the spring 40 on the inboard side of the flange 24 and inboard side 30a of the first vertical leg 30 allowing the flange 24 and the first vertical leg to separate. The fastener 44 slides in a through bore 46 in the second vertical leg 32 which allows the flange 26 to tilt away from the outboard side 32b of the second vertical leg 32. This allows the step 20 to tilt out of the way in the direction 48 if there is interference with an obstacle (as shown by the upward arrow R). This concept allows for the step to flex up, to contact the frame, without putting all of the loading on the linkages, while still maintaining rigidity for stepping loads in the down direction. As shown in FIG. 2B in operation the compressive load between the mating surfaces (as shown by the horizontal arrows C-C and C1-C1)

of step and lower mount, to support a stepping load S (as shown by the downward arrow)

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A mounting system for a step of a vehicle comprising:
   a step portion which is deployed in a fixed horizontal stepping position but deflectable upward upon striking an object from below which automatically returns to said fixed stepping position after being deflected upward having two connecting flanges along the same vertical plane;
   a load bearing adapter which allows a normally fixed horizontal stepping surface of the step portion for a person to step on but allows deflectable upward movement and return to a fixed horizontal stepping position after being, deflectable upward movement of the step portion and thereafter returns to the fixed horizontal stepping position after being deflected upward, said load bearing adapter including a first vertical leg, a second vertical leg and a horizontally extending intermediate leg connecting the first vertical leg and second vertical leg; each of the first vertical leg and second vertical legs having an outboard side and an inboard side in relationship to the vehicle, wherein a first flange of said connecting flanges is positioned next to the inboard side of the first vertical leg and a second flange of said two connecting flanges is positioned next to said outboard side of said second vertical leg;
   a first fastener assembly for moveably fastening said first flange to said inboard flange of said first vertical leg, said fastener including a biasing spring for providing biasing against the outboard side and allowing movement to the inside which allows movement of the flange;
   a second fastener assembly for moveably fastening said second flange to said outboard side of said second leg with a biasing spring interposed between a fastener head and the inboard side of the second vertical leg; and,
   wherein an upward force on the step portion from encountering an obstacle from below allows upward movement of the step portion and automatically returning the step portion to the fixed horizontal stepping position after the step portion is deflected upward when not encountering an obstacle from below.

2. The mounting system of claim 1 wherein the second fastener is attached to an automated running board linkage.

3. The mounting system of claim 1 wherein the second fastener is attached to a mechanically actuated linkage which is attached to the vehicle.

4. The mounting system of claim 1 wherein the second fastener is attached directly to the vehicle.

5. The mounting system of claim 1 wherein a weld nut is welded to said second flange for receiving threads of the second fastener and the second vertical leg includes a through bore for allowing sliding movement of the fastener therethrough.

6. The mounting system of claim 5 wherein the first vertical leg includes a threaded bore for receiving the first fastener.

7. A mounting system for a step of a vehicle comprising:
   a step portion having a connecting flange comprising a pair of flanges connected to said load bearing adapter along the same vertical plane, said step portion is deployed in a fixed horizontal stepping position but deflectable upward upon striking an object from below which automatically returns to said fixed stepping position after being deflected upward;

a load bearing adapter operably connected to the vehicle, said load bearing adapter comprising a first vertical leg, a second vertical leg and a horizontally extending intermediate leg connecting the first vertical leg and second vertical leg; each of the first vertical leg and second vertical legs having an outboard and an inboard side in relationship to the vehicle, wherein a first flange of said connecting flanges is positioned next to the inboard surface of a first vertical leg and a second flange of said two connecting flanges is positioned next to said outboard surface of said second vertical leg;

a connecting assembly normally in the step position which deflects upwardly when encountering contact with an object from below and returning to the step position after encountering an object from below, wherein the connecting assembly connects the connecting flange to the load bearing adapter for allowing a rigid connection when the step portion has a stepping load and allows tilting of the step portion when an obstacle is encountered which provides a load on the step in an upward direction and wherein said connection assembly further comprises: a first fastener assembly for moveably fastening said first flange to said inboard flange of said first vertical leg, said fastener including a biasing spring for providing biasing toward the outside and providing motion to the inside; and, a second fastener assembly for moveably fastening said second flange to said outboard side of said second leg with a biasing spring interposed between a fastener head and the inboard side of the second vertical leg; and, wherein an upward force on the step portion from encountering an obstacle from below allows upward movement of the step portion and automatically returning the step portion to the fixed horizontal stepping position after the step portion is deflected upward when not encountering an obstacle from below.

8. The mounting system of claim 7 wherein the second fastener is attached to an automated running board linkage.

9. The mounting system of claim 7 wherein the second fastener is attached to a mechanically actuated linkage which is attached to the vehicle.

10. The mounting system of claim 7 wherein the second fastener is attached directly to the vehicle.

11. The mounting system of claim 7 wherein a weld nut is welded to said second flange for receiving threads of the second fastener and the second vertical leg includes a through bore for allowing sliding movement of the fastener therethrough.

12. The mounting system of claim 11 wherein the first vertical leg includes a threaded bore for receiving the first fastener.

\* \* \* \* \*